3,335,056
TETRAMETHYL-QUERCETIN AS A
NATRIURETIC
Charles Mentzer, Verrieres-le-Buisson, France, assignor to Laboratoires Laroche Navarron, Levallois-Perret, France, a French body corporate
No Drawing. Filed Mar. 30, 1965, Ser. No. 444,029
Claims priority, application France, May 12, 1964, 974,144
6 Claims. (Cl. 167—65)

The object of the present invention is to provide a new flavone having natriuretic properties namely: 5-hydroxy-3,7,3′,4′-tetramethoxy flavone or tetramethylquercetin.

The tetramethylquercetin is a compound chemically defined by the formula:

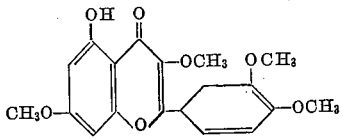

This compound is present in the form of pale yellow flakes melting at 151–152° C. It is insoluble in water, soluble in boiling alcohol and chloroform. Its spectral curve in ultra-violet (in $0.5 \times 10^{-5}$ solution in alcohol without reducing agent) has two absorption maximums at 255 m$\mu$ ($D_o = 0.330$) and 350 m$\mu$ ($D_o = 0.309$).

It gives a positive reaction in the Wilson test, that is to say, a mixture of 1 ml. of alcohol solution containing 2 mg. of tetramethylquercetin, 1 ml. of 10% citric acid solution in dry acetone and 1 ml. of saturated boric acid solution in dry acetone, gives a yellow colour superior to that obtained with the same mixture in boric acid.

Another object of the invention is to provide a process of preparing tetramethylquercetin by the selective methylation of the quercetin or 3,3′,4′,5,7-pentahydroxy flavone by an appropriate methylation agent.

The preferred methylating agent is methyl sulfate, particularly in the presence of potassium carbonate in an anhydrous acetone medium. The methylation is then obtained by prolonged refluxing of the reaction mixture for example for 17 hours, the reagents being in substantially stoichiometric proportions. It is also possible to employ methyl sulfate in a sodic aqueous solution, but in this case a methylation in 5-position is liable to occur.

As other methylating agents of use there may be mentioned diazomethane in ethereal solution, which preferentially gives the tetramethylated derivative but is not as easy to use as methyl sulfate and methyl iodide.

However, the latter is not very cheap and has poor selectivity since it is liable to produce nuclear methylation.

The following example illustrates the preparation of tetramethylquercetin.

*Example*

The following reaction mixture is prepared:
6.04 g. (1/50 mole) of quercetin.
11.26 g. of methyl sulfate (theoretical amount increased by 1/10).
11.26 g. of $CO_3K_2$ previously dried in the drying oven.
Anhydrous acetone in an amount for dissolving the flavone.

The mixture is refluxed for 17 hours. After cooling and elimination of the solvent, the residue is triturated with concentrated ClH, washed with water and crystallized in alcohol.

It has been discovered according to the invention that tetramethylquercetin increases the elimination of sodium by the urinary route.

These natriuretic properties of tetramethylquercetin render it of value in all cases where the sodium is abnormally retained in the organism either accidentally or subsequent to the administration of corticosteroids.

The following pharmacological tests illustrate the foregoing:

These tests were carried out in accordance with a method adapted from that proposed by W. L. Lipschitz, S. Hadidian and A. Kerpesar (Jl. of Pharmacology, 1943, 79, 97).

The tests were carried out on male rats having the same origins weighing 130–170 g. and deprived of water and nourishment 18 hours before the test.

The animals are separated into four homogeneous batches.

One batch serving as a reference batch and receiving physiological serum at the dose of 2.5 ml./100 g. of body weight.

The three other batches receiving the product to be investigated respectively at the dose of:
10 mg. per 100 g. of body weight;
20 mg. per 100 g. of body weight;
50 mg. per 100 g. of body weight.

The substances are administered by individual forced feeding by means of an esophageal probe in solution or suspension in the physiological serum to which is added 2% of gum in the proportion of 2.5 ml. per 100 g. of body weight.

The animals are placed in a metabolism testing cage, 2–3 animals being in each cage. The time is noted. At the end of 5 hours a further forced urination of the animals is effected and the test stopped. The urine of each cage is collected.

In respect of each sample, the following measurements are taken:
The measurement of the volume of urine per cage.
The chlorine content according to a modified Votocek method (titration by mercuric nitrate in a nitric medium in the presence of diphenyl carbazone).
The sodium content by flame photometry.
For each test, the following was carried out:
(1) The mean body weight of the animals ascertained.
(2) The diuresis over a period of 5 hours was evaluated and expressed as:
Per each animal;
Per 100 g. of body weight so as to render the various tests comparable with each other.
The contents of chlorine and sodium are expressed:
On one hand, as a concentration (namely, as g./l.)
On the other, as the amount of ions eliminated, that is to say, the diuresis over a period of 5 hours is measured and expressed as mg./100 g. of body weight.
(3) The following values are ascertained in respect of each batch.

Diuretic activity:
$$\frac{\text{diuresis in ml./5 h./100 g. of the treated batch}}{\text{diuresis in ml./5 h./100 g. of the reference batch}}$$

Chloriuretic activity:
$$\frac{\text{mg. of Cl}_2\text{/5 h./100 g. in the treated batch}}{\text{mg. of Cl}_2\text{/5 h./100 g. in the reference batch}}$$

Natriuretic activity:
$$\frac{\text{mg. of Na/5 h./100 g. in the treated batch}}{\text{mg. of Na/5 h./100 g. in the reference batch}}$$

Three series of tests were carried out with tetramethylquercetin.

The results of these tests were assembled and the mean activity coefficients ascertained.

The results are listed in the following tables:

TETRAMETHYLQUERCETIN.—Test No. 1

|  | Batch R Reference | Batch A 20 mg./100 g. | Batch B 50 mg./100 g. |
|---|---|---|---|
| Number of animals | 8 | 8 | 8 |
| Mean weights | 108 | 107 | 108 |
| Diuresis: | | | |
|   Total (ml.) | 6.9 | 5.9 | 5.9 |
|   Mean (ml.) | 0.86 | 0.74 | 0.74 |
|   In 5 h. per 100 g. of body weight (ml.) | 0.80 | 0.70 | 0.70 |
| Chlorine: | | | |
|   (G./l.) | 6.10 | 7.35 | 6.25 |
|   Mg./5 h./per 100 g. of body weight | 4.9 | 5.1 | 4.3 |
| Sodium: | | | |
|   (G./l.) | 3.4 | 3.55 | 3.88 |
|   Mg./5 h./per 100 g. of body weight | 2.72 | 2.48 | 2.70 |
| Activity coefficients: | | | |
|   Water | | 0.87 | 0.87 |
|   Chlorine | | 1.04 | 0.89 |
|   Sodium | | 0.91 | 1 |

TETRAMETHYLQUERCETIN.—Test No. 2

|  | Batch R Reference | Batch A 10 mg./100g. | Batch B 20 mg./100 g. | Batch C 50 mg./100 g. |
|---|---|---|---|---|
| Number of animals | 5 | 5 | 5 | 5 |
| Mean weights | 136 | 135 | 136 | 136 |
| Diuresis: | | | | |
|   Total (ml.) | 4.8 | 3.7 | 5.8 | 8.1 |
|   Mean (ml.) | 0.96 | 0.74 | 1.16 | 1.6 |
|   In 5 h. per 100 g. of body weight (ml.) | 0.70 | 0.54 | 0.85 | 1.1 |
| Chlorine: | | | | |
|   (G./l.) | 8.1 | 9 | 6 | 4.9 |
|   Mg./5 h./per 100 g. of body weight | 5.7 | 4.85 | 5.1 | 5.4 |
| Sodium: | | | | |
|   (G./l.) | 2.35 | 3.05 | 3 | 2.95 |
|   Mg./5 h./per 100 g. of body weight | 1.65 | 1.65 | 2.55 | 3.25 |
| Activity coefficients: | | | | |
|   Water | | 0.77 | 1.20 | 1.50 |
|   Chlorine | | 0.85 | 0.90 | 0.95 |
|   Sodium | | 1 | 1.50 | 2 |

TETRAMETHYLQUERCETIN.—Test No. 3

|  | Batch R Reference | Batch A 10 mg./100g. | Batch B 20 mg./100 g. | Batch C 50 mg./100 g. |
|---|---|---|---|---|
| Number of animals | 4 | 4 | 4 | 4 |
| Mean weights | 170 | 171 | 169 | 169 |
| Diuresis: | | | | |
|   Total (ml.) | 7.2 | 5.8 | 3.6 | 8 |
|   Mean (ml.) | 1.8 | 1.45 | 0.9 | 2 |
|   In 5 h. per 100 g. of body weight (ml.) | 1.05 | 0.84 | 0.53 | 1.18 |
| Chlorine: | | | | |
|   (G./l.) | 6.6 | 7 | 9.9 | 6.1 |
|   Mg./5 h./per 100 g. of body weight | 6.95 | 5.90 | 5.23 | 7.2 |
| Sodium: | | | | |
|   (G./l.) | 2.55 | 2.80 | 3.70 | 2.30 |
|   Mg./5 h./per 100 g. of body weight | 2.67 | 2.35 | 1.95 | 2.70 |
| Activity coefficients: | | | | |
|   Water | | 0.8 | 0.5 | 1.1 |
|   Chlorine | | 0.85 | 0.75 | 1.03 |
|   Sodium | | 0.88 | 0.73 | 1 |

According to these tables, the mean activity coefficients of tetramethylquercetin are as follows for each dose as concerns water, chlorine and sodium:

| Water | | | Chlorine | | | Sodium | | |
|---|---|---|---|---|---|---|---|---|
| 10 mg. | 20 mg. | 50 mg. | 10 mg. | 20 mg. | 50 mg. | 10 mg. | 20 mg. | 50 mg. |
| 0.78 | 0.85 | 1.15 | 0.85 | 0.90 | 0.95 | 0.94 | 1.05 | 1.33 |

Thus, it is clear that although tetramethylquercetin is practically inactive as concerns the elimination of chlorine, it is active at the dose of 50 mg./100 g. as concerns the elimination of water and above all constitutes a powerful natriuretic which is active as soon as the dose of 20 mg./100 g. is reached and very active at the dose of 50 mg./100 g. in respect of which the elimination of sodium exceeds by 33% that of the reference animals.

Bearing in mind the foregoing, the invention also covers a therapeutic composition containing tetramethylquercetin and a pharmaceutically acceptable vehicle indicated in the case of retention of sodium by the organism manifested by a disturbance of the water-sodium metabolism.

In these indications, the composition is advantageously administered by the oral route at the daily dose of 0.10–1.20 g. Suitable forms for this mode of administration are tablets and pills, the active principle being associated with the usual vehicles and excipients.

By way of illustration, two examples of tablet forms will be given hereinafter, one of which concerns a weak dose and the other a strong dose of active principle, in order to facilitate the prescriptions:

*Weak dose*

For one tablet:

| | G. |
|---|---|
| Tetramethylquercetin | 0.10 |
| Lactose | 0.075 |
| Starch | 0.010 |
| Magnesium stearate | 0.005 |
| Talc | 0.010 |

*Strong dose*

For one tablet:

| | G. |
|---|---|
| Tetramethylquercetin | 0.40 |
| Lactose | 0.075 |
| Starch | 0.010 |
| Magnesium stearate | 0.005 |
| Talc | 0.010 |

Two to six of these tablets can be administered daily.

Having now described my invention what I claim as new and desire to secure by Letters Patent is:

1. Therapeutic composition having natriuretic properties, comprising 0.10–1.20 g. of tetramethylquercetin and a pharmaceutically acceptable vehicle.

2. Therapeutic composition as claimed in claim 1, wherein the vehicle is acceptable by the oral route, the composition containing an amount of tetramethylquercetin suitable for a daily administration by the oral route of about 0.10–1.20 g. of tetramethylquercetin.

3. Therapeutic composition having natriuretic properties in the form of tablets comprising tetramethylquercetin and a solid pharmaceutically acceptable base for tablets.

4. Therapeutic composition as claimed in claim 3, wherein each tablet contains about 0.10–0.40 g. of tetramethylquercetin.

5. Process for treating patients suffering from a sodium retention, comprising orally administering to said patients an effective dose of tetramethylquercetin.

6. Process for treating patients suffering from a sodium retention, comprising orally administering to said patients tetramethylquercetin at a daily dose of 0.10–1.20 g.

References Cited

Awasthi et al.: Chemical Abstracts, vol. 57, col. 15059–15060, 1962.

Jurd: Chemical Abstracts, vol. 57, col. 3396(i) 1962.

Rahman: Chemical Abstracts, vol. 57, col. 2179(e) 1962.

ALBERT T. MEYERS, *Primary Examiner.*

JULIAN S. LEVITT, *Examiner.*

LEROY B. RANDALL, *Assistant Examiner.*